US008132516B2

(12) United States Patent
Pietila et al.

(10) Patent No.: US 8,132,516 B2
(45) Date of Patent: Mar. 13, 2012

(54) OFFICE SYSTEM FOR MOTOR VEHICLE PASSENGER COMPARTMENT

(75) Inventors: Thomas W. Pietila, Brighton, MI (US); Anthony Ligi, Jr., Chelsea, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 312 days.

(21) Appl. No.: 12/551,633

(22) Filed: Sep. 1, 2009

(65) Prior Publication Data

US 2011/0048289 A1    Mar. 3, 2011

(51) Int. Cl.
*A47B 37/00* (2006.01)
(52) U.S. Cl. ......... 108/44; 108/26; 224/275; 296/37.12; 296/37.15
(58) Field of Classification Search ............... 296/24.34, 296/37.12, 37.15, 69; 297/188.01, 188.2; 312/233; 108/42, 44, 1, 25, 26; 244/275; D12/416
See application file for complete search history.

(56) References Cited

U.S. PATENT DOCUMENTS

| | | | | |
|---|---|---|---|---|
| 3,164,109 A * | 1/1965 | Atkinson | ......................... | 108/44 |
| 3,345,118 A * | 10/1967 | Cummings | ................ | 312/235.8 |
| 4,577,788 A * | 3/1986 | Richardson | .................... | 224/483 |
| 4,909,159 A * | 3/1990 | Gonsoulin | ...................... | 108/44 |
| 4,946,120 A * | 8/1990 | Hatcher | ...................... | 248/183.2 |
| 5,337,677 A | 8/1994 | Peeno | | |
| 5,505,139 A * | 4/1996 | Storholm et al. | ................ | 108/44 |
| 5,551,616 A * | 9/1996 | Stitt et al. | ....................... | 224/275 |
| 5,560,676 A * | 10/1996 | Griffith et al. | ............. | 297/188.2 |
| 5,628,438 A * | 5/1997 | Legrow | ........................... | 224/275 |
| 5,628,439 A * | 5/1997 | O'Hara | ......................... | 224/275 |
| 5,667,272 A * | 9/1997 | Sutton | ........................... | 297/140 |
| 5,973,917 A * | 10/1999 | White | ........................ | 312/223.2 |
| 6,015,198 A * | 1/2000 | Stair | ........................ | 312/235.1 |
| 6,095,060 A * | 8/2000 | Ma | .................................... | 108/45 |
| 6,135,546 A * | 10/2000 | Demtchouk | .................. | 297/135 |
| 6,382,745 B1 * | 5/2002 | Adkins | ....................... | 312/223.3 |
| 6,426,869 B1 * | 7/2002 | White | ...................... | 361/679.01 |
| D462,171 S * | 9/2002 | Elabour | ......................... | D3/284 |
| 6,692,051 B1 * | 2/2004 | Cook et al. | ................. | 296/24.39 |
| 6,755,137 B2 | 6/2004 | Wentz | | |
| 7,293,507 B2 * | 11/2007 | DePue et al. | ..................... | 108/44 |
| 7,303,226 B2 * | 12/2007 | Bernstein et al. | ........ | 296/190.01 |
| D560,912 S * | 2/2008 | Williams et al. | ............... | D3/315 |
| 7,415,932 B1 | 8/2008 | Ngo | | |
| 7,455,204 B2 * | 11/2008 | Lippert et al. | ................ | 224/275 |
| 7,611,183 B2 * | 11/2009 | Burkey et al. | .............. | 296/37.15 |
| 2007/0131568 A1 * | 6/2007 | Georgia et al. | ................ | 206/223 |
| 2008/0083351 A1 * | 4/2008 | Lippert et al. | .................. | 108/44 |
| 2008/0190330 A1 * | 8/2008 | Bart et al. | ........................ | 108/44 |
| 2011/0048289 A1 * | 3/2011 | Pietila et al. | .................... | 108/44 |

\* cited by examiner

*Primary Examiner* — Darnell Jayne
*Assistant Examiner* — Daniel Rohrhoff
(74) *Attorney, Agent, or Firm* — MacMillian, Sobanski & Todd, LLC

(57) ABSTRACT

A work surface/storage system can be attached to a motor vehicle which has a passenger compartment with a driver seat, a passenger seat, a passenger restraint belt, and a dash panel in front of the passenger seat. A main body section of the system includes at least one flat surface for providing a writing support for a person in the driver seat, at least one storage bin, and a bottom surface for positioning on the passenger seat. A belt receptacle is located at a rearward end of the main body for capturing the passenger restraint belt so that tension in the passenger restraint belt loads the rearward end against the passenger seat. A front wing section extends forward and upward from the main body section to a distal end. The distal end includes an attachment tab. A bay is provided in the dash panel including a holder for capturing the attachment tab.

11 Claims, 5 Drawing Sheets

US 8,132,516 B2

OFFICE SYSTEM FOR MOTOR VEHICLE PASSENGER COMPARTMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to interior features in a motor vehicle to facilitate mobile office tasks of a driver, and, more specifically, to a work surface/storage system to facilitate file keeping and writing tasks of a person (such as a police officer) in the driver seat of the vehicle.

Storage space and working surfaces within a typical motor vehicle are very limited. The performance of work or other activities involving office-like functions (e.g., writing on documents, using paper files and folders, or using personal items) is a challenge in a mobile environment.

Various tray systems have been proposed to provide a working surface. Some systems have deployed from the vehicle dashboard in the manner of a sliding shelf. U.S. Pat. No. 6,095,060 to Ma shoes a tray that connects by suction cups to the windshield and the dashboard. Other support structures have hung over the vehicle seat (e.g., U.S. Pat. No. 7,415,932 to Ngo).

A dual use of the passenger seating area is sometimes desirable because a vehicle may be used by only a driver (e.g., a highway patrol officer or a traveling sales representative). When no passenger is present, the space can instead be used for a storage system for the driver. Existing deployable systems, however, have suffered from the disadvantage that they lack the stability and rigidity to perform well as a solid writing support surface. Movement of the support surface not only makes writing difficult, but may cause beverages or other items spill from their associated compartments. Therefore, a system is needed that is easily mounted and yet provides a stable and rigid support surface together with storage capabilities associated with office-like functions in a motor vehicle.

SUMMARY OF THE INVENTION

The present invention uses coordinated attachment features to solidly fix the work surface within the passenger compartment to provide a stable platform upon which the driver can write upon a document.

In one aspect of the invention, a work surface/storage system is provided for a motor vehicle. The motor vehicle has a passenger compartment with a driver seat, a passenger seat, a passenger restraint belt, and a dash panel in front of the passenger seat. A main body section of the system includes at least one flat surface for providing a writing support for a person in the driver seat, at least one storage bin, and a bottom surface for positioning on the passenger seat. A belt receptacle is located at a rearward end of the main body for capturing the passenger restraint belt so that tension in the passenger restraint belt loads the rearward end against the passenger seat. A front wing section extends forward and upward from the main body section to a distal end. The distal end includes an attachment tab. A bay is provided in the dash panel including a holder for capturing the attachment tab.

DETAILED DESCRIPTION OF PREFERRED EMBODIMENTS

Figure 1:
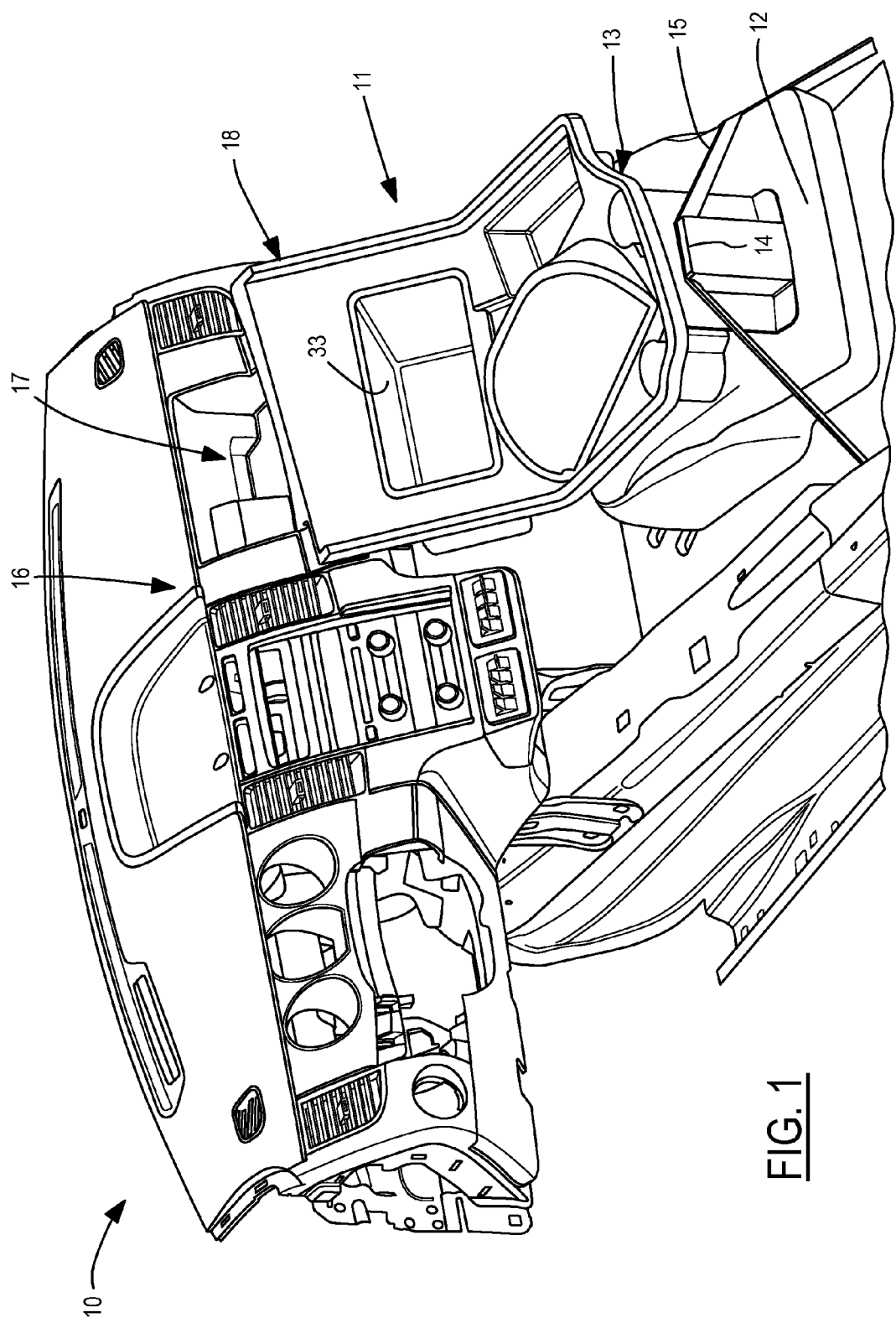
FIG. 1 is a perspective view of an office system of the present invention mounted within a vehicle.

Referring now to FIG. 1, a vehicle interior passenger compartment 10 is shown with one embodiment of a work surface/storage system of the present invention. The work surface/storage system includes a removable unit 11 that rests on a passenger seat 12. Unit 11 has a rearward end 13 that includes a belt receptacle 14 for receiving a passenger seatbelt 15, whereby tension in belt 15 loads rearward end 13 against passenger seat 12. The vehicle includes a dash panel 16 in front of the seats and including typical vehicle accessories such as an audio system and climate control. Dash panel 16 provides a portion of the work surface/storage system, namely a bay 17 for anchoring a front portion 18 of removable unit 11.

Figure 2:
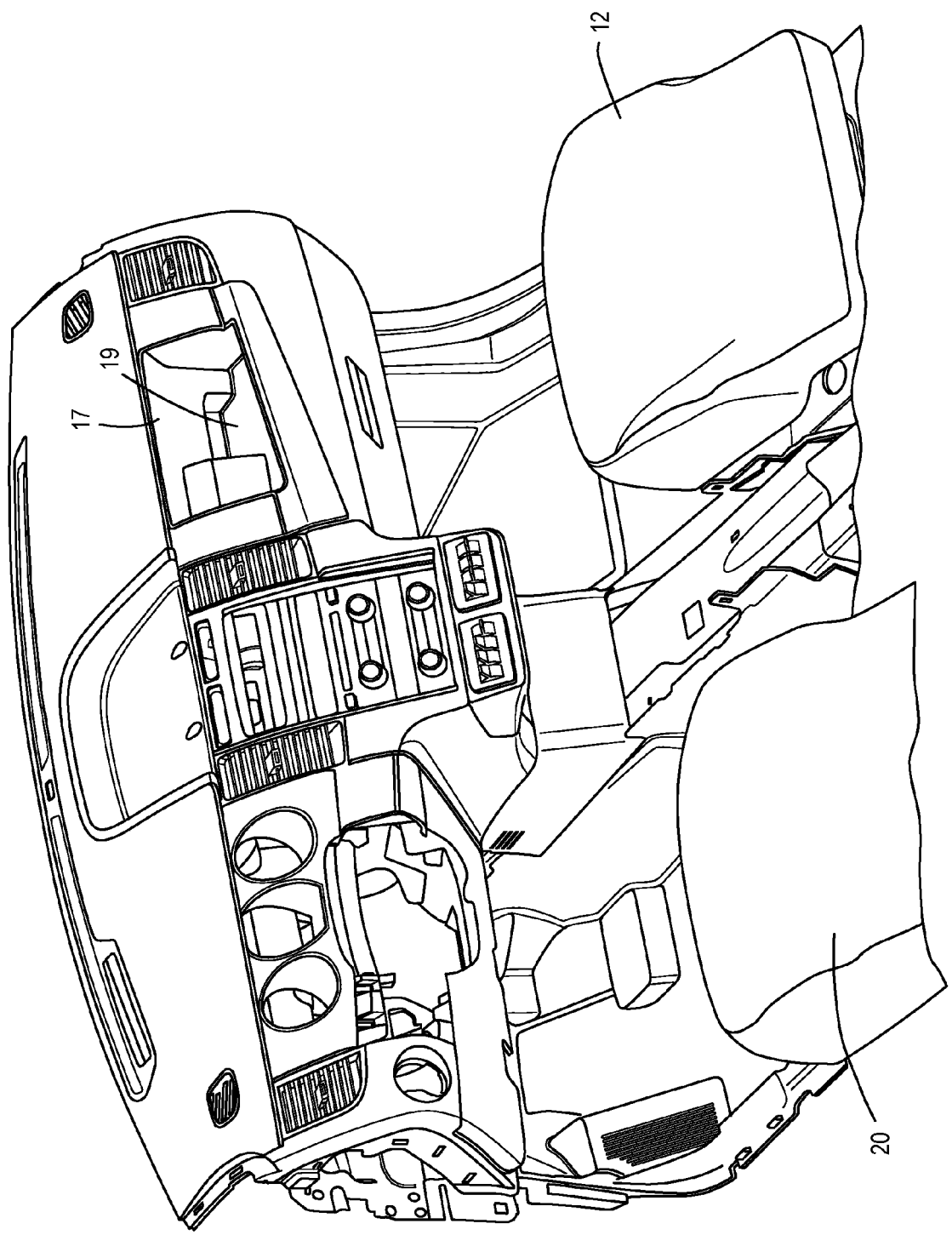
FIG. 2 is a perspective view of a portion of the passenger compartment with the main portion of the office system removed.
Figure 3:
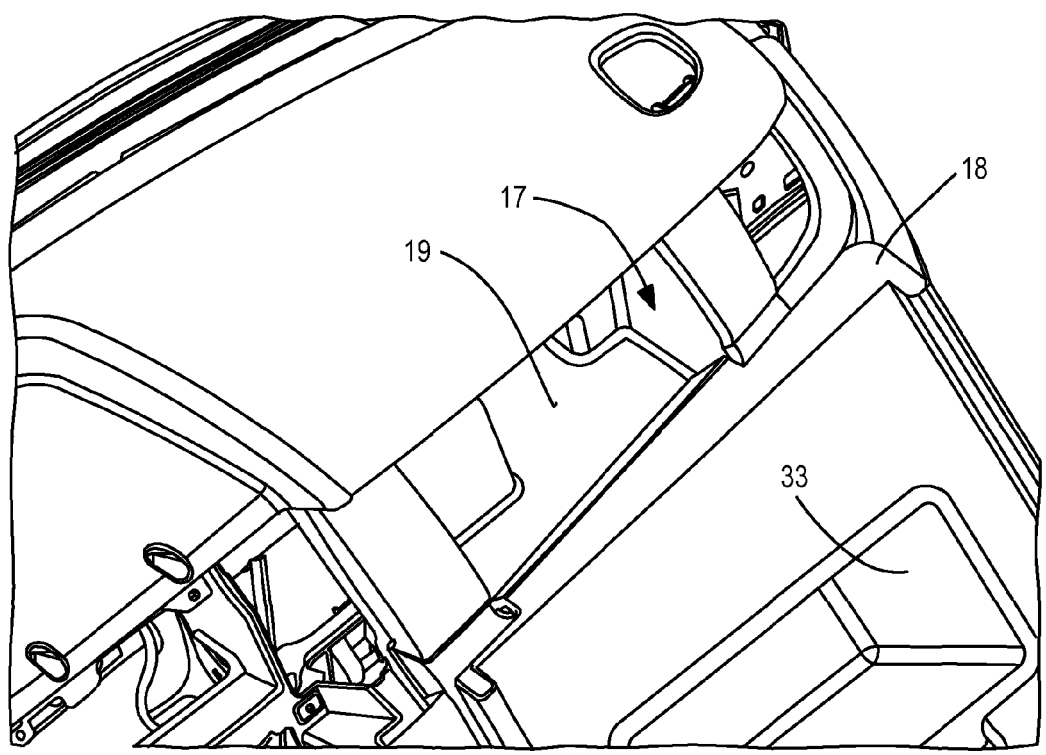
FIG. 3 is a perspective view of the forward interconnection of the system with the dashboard of a vehicle.

Bay 17 is a fixed part of the vehicle dashboard. FIG. 2 shows that when removable unit 11 is removed, bay 17 remains in place. It provides a holder (described below) for connecting to front portion 18 of removable unit 11. Bay 17 may further provide a storage tray 19 that can be used for storing items either with or without removable unit 11 in place. FIG. 3 shows that storage compartment 19 is accessible even with the forward end 18 of removable unit 11 locked in place with bay 17. FIG. 2 shows a driver seat 20 where a driver would typically sit when using the work surface/storage compartment on the present invention.

Figure 4:
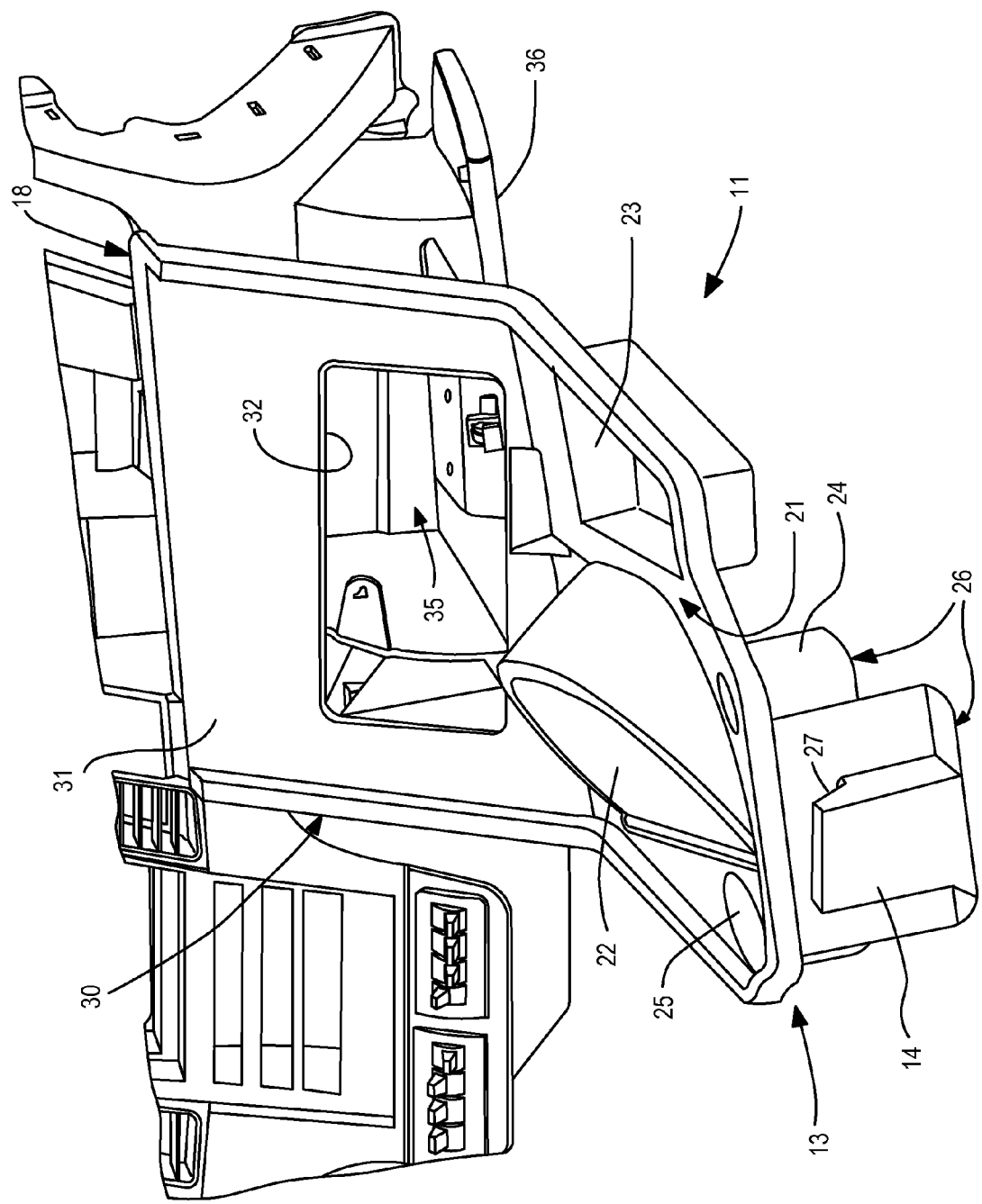
FIG. 4 is a perspective view of the office system with the file bin removed to access the glove box of the vehicle.

As shown in FIG. 4, removable unit 11 may preferably comprise a main body section 21 with at least one flat surface 22 for providing writing support for a person in the driver seat. Main body section 21 further includes at least one storage bin or well such as a bin 23. Preferably, bin 23 may be comprised of a flat bottomed well having a length sufficient to receive one or more standard pens or pencils (e.g., having a length of about six inches) and/or other office supplies such as paperclips, markers, or a stapler. Other storage bins in main body section 21 may be comprised of cupholders 24 and 25, for example. Main body section 21 further includes a bottom surface 26 for positioning on the passenger seat. The bottom surface 26 may be provided at the bottom of a stanchion for belt receptacle 14 or at the bottom edge of cupholder 24, for example. For maximum stability, bottom surface 26 should extend below belt receptacle 14. The passenger restraint belt passing through an upward facing, transverse groove 27 in receptacle 14 which provides a bearing surface for the passenger restraint belt directly above bottom surface 26 to stabilize the rearward end 13 of unit 11. The tension provided by the typical restraint belt mechanism keeps rearward end 13 in place.

Preferably, flat surface 22 is comprised of an inclined plane that is tilted in the direction of the driver's seat. The tilt in the flat surface 22 makes writing more comfortable and helps prevent sliding of the document while writing on it.

Removable unit 11 includes a front wing section 30 extending forward and upward from main body section 21 to its forward (distal) end 18. Front wing section 30 includes a sloping panel section 31 having an aperture 32 as best shown in FIG. 4. As shown in FIGS. 1 and 3, a removable file bin 33 may be mounted within aperture 32. File bin 33 preferably extends perpendicularly to sloping panel section 31 so that files or other documents placed in file bin 33 tend to remain there. When file bin 33 is removed as shown in FIG. 4, the opening through aperture 32 gives access to a glove box 35 that is part of the vehicle dashboard. Thus, the glove box 35 may have a door 36 aligned with aperture 31 so that the driver may reach through aperture 32 in order to access glove box 35.

Figure 5:
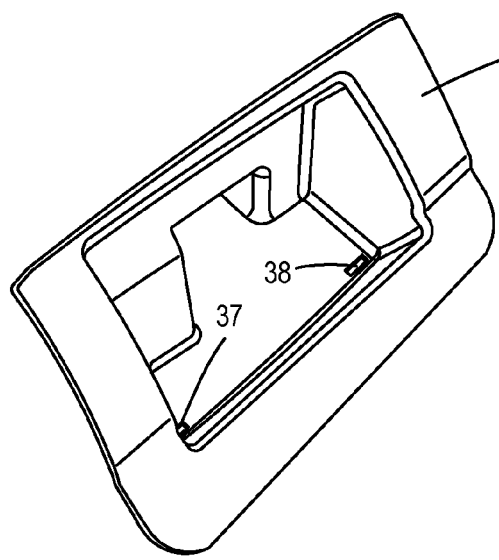
FIG. 5 is a perspective view of the bay of the present invention.
Figure 6:
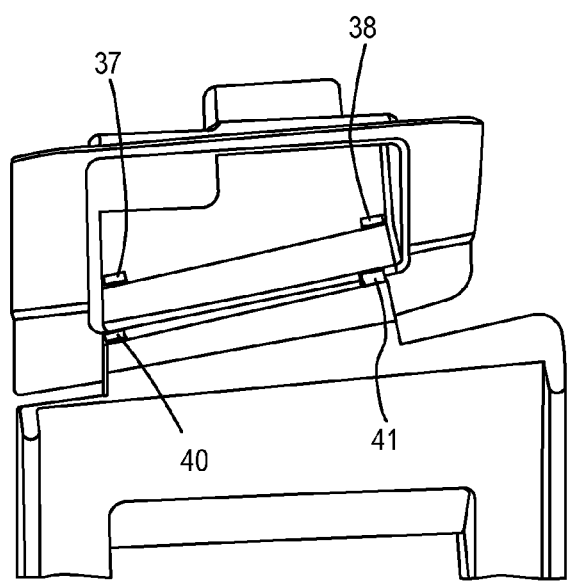
FIG. 6 is a top view showing the front wing section and the bay prior to being interconnected.
Figure 7:
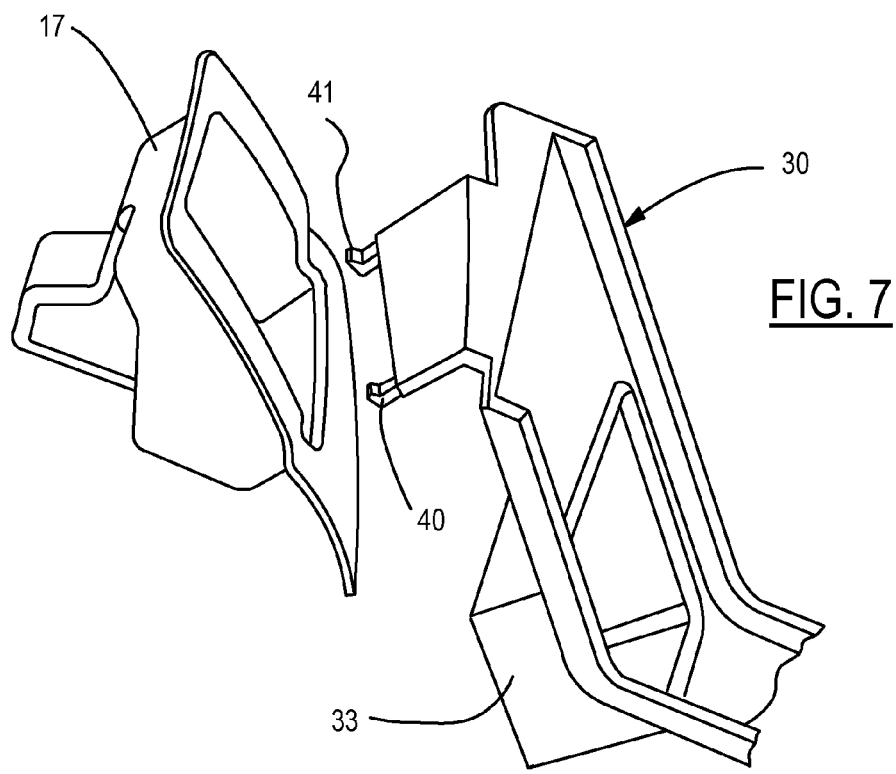
FIG. 7 is a partial perspective view showing attachment tabs on respective lateral sides of the front wing section.

Front wing section 30 and bay 17 include features for locking the forward end of the removable unit in place as shown in FIGS. 5-7. Bay 17 includes a pair of holes 37 and 38 for receiving a pair of attachment tabs 40 and 41, respectively. Attachment tabs 40 and 41 extend from respective lateral sides of front wing section 30, and are preferably hook shaped so that they hook together with bay 17. Thus, the removable unit is preferably mounted by raising the rear end above the forward end so that attachment tabs 40 and 41 can be inserted into holes 37 and 38, and then the rear end is rotated downward to the passenger seat so that the hook-shaped attachment tabs are locked into holes 37 and 38 for a stable, rigid interconnect.

Figure 8:
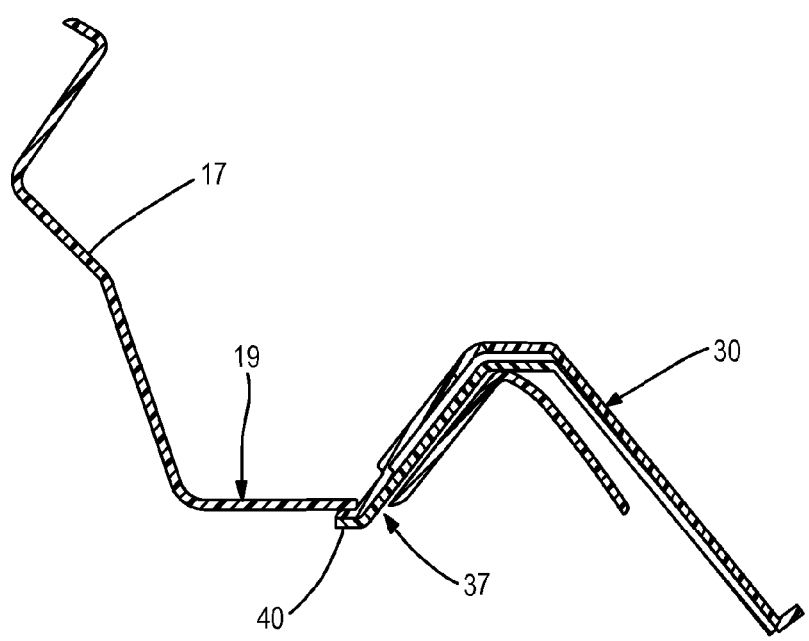
FIG. 8 is a cross section showing the hooking of the attachment tabs into the bay.

FIG. 8 is a cross-section showing the insertion of attachment tab 40 through corresponding hole 37.

The bay and the corresponding parts of the removable unit (i.e., the main body section, belt receptacle, and front wing section) are preferably molded using polypropylene. The parts may be painted or can be formed using a molded-in-color process, as known in the art. The removable unit may be integrally formed as primarily one piece (such as the main body section and the front wing section) or may be separately molded and then vibration welded together (such as the main body section and the belt receptacle). Other surface treatments or trims may be used such as a rubber, non-skid surface added to the writing support surface.

As a result of the front interconnection of the removable unit with the holder in the front bay and the rear anchoring of the removable unit by the tension of the passenger restraint belt captured in belt receptacle, the removable unit is securely held in place. The stability of unit ensures that an acceptable writing surface is provided and that contents in the storage compartments are safely stowed.

What is claimed is:

1. A work surface/storage system for a motor vehicle, wherein the motor vehicle has a passenger compartment with a driver seat, a passenger seat, and a passenger restraint belt, the system comprising:
   a dash panel configured to be placed in front of the passenger seat;
   a removable unit comprising:
      a main body section including at least one flat surface for providing a writing support for a person in the driver seat, including at least one storage bin, and including a bottom surface for positioning on the passenger seat;
      a belt receptacle at a rearward end of the main body for capturing the passenger restraint belt so that tension in the passenger restraint belt loads the rearward end against the passenger seat; and
      a front wing section extending forward and upward from the main body section to a distal end, wherein the distal end includes an attachment tab; and
   a bay in the dash panel including a holder for removably capturing the attachment tab, whereby the interconnection of the attachment tab to the holder and the loading of the rearward end by capturing the passenger restraint belt by the belt receptacle provide stability for the writing support.

2. The system of claim 1 wherein the front wing section has a pair of attachment tabs, each located on a respective lateral side of the distal end.

3. The system of claim 2 wherein the holder is comprised of a pair of holes in the bay in respective matching locations with that attachment tabs so that they hook together prior to tensioning the passenger restraint belt.

4. The system of claim 1 wherein the front wing section includes a sloping panel section having an aperture, and wherein the system further comprises a file bin removably mounted within the aperture.

5. The system of claim 4 wherein the dash panel includes a door for a vehicle glove box, and wherein the aperture of the sloping panel section is aligned with the door so that when the file bin is absent from the aperture then the glove box is accessible through the aperture.

6. The system of claim 1 wherein the flat surface of the main body section comprises an inclined plane that is tilted in the direction of the driver seat.

7. The system of claim 1 wherein the storage bin of the main body section comprises a flat-bottomed well having a length sufficient to receive a 6-inch pen or pencil.

8. The system of claim 1 wherein the storage bin of the main body section comprises a cupholder.

9. The system of claim 1 wherein the belt receptacle comprises an upward facing, transverse groove providing a bearing surface for the passenger restraint belt.

10. The system of claim 1 wherein the bay includes a storage well.

11. The system of claim 1 wherein the main body section, belt receptacle, front wing section, and bay are comprised of molded polypropylene.

* * * * *